United States Patent [19]
Stephenson

[11] Patent Number: 6,031,579
[45] Date of Patent: *Feb. 29, 2000

[54] WEATHER PARAMETER DISPLAY SYSTEM

[75] Inventor: William Monroe Stephenson, New Orleans, La.

[73] Assignee: Thomas R. Vigil, Barrington, Ill.; a part interest

[*] Notice: This patent issued on a continued prosecution application filed under 37 CFR 1.53(d), and is subject to the twenty year patent term provisions of 35 U.S.C. 154(a)(2).

[21] Appl. No.: 08/851,570

[22] Filed: May 5, 1997

[51] Int. Cl.⁷ .............................. H04N 7/00; H04N 5/445
[52] U.S. Cl. ..................... 348/564; 348/552; 340/693; 340/539
[58] Field of Search ............................. 340/601, 602, 340/825.54, 825.69, 825.72, 636, 539, 693, 660; 341/176; 359/142, 143, 146, 145; 348/10, 9, 552, 564

[56] References Cited

U.S. PATENT DOCUMENTS

| | | | |
|---|---|---|---|
| 4,287,762 | 9/1981 | Baer | 73/170 R |
| 5,019,977 | 5/1991 | PaPointe et al. | 364/420 |
| 5,432,561 | 7/1995 | Strubbe | 348/565 |
| 5,438,372 | 8/1995 | Tsumori et al. | 348/365 |
| 5,500,691 | 3/1996 | Martin et al. | 348/734 |
| 5,519,527 | 5/1996 | Panton | 359/159 |
| 5,528,304 | 6/1996 | Cherrick et al. | 348/565 |
| 5,557,338 | 9/1996 | Maze et al. | 348/565 |
| 5,561,471 | 10/1996 | Kim et al. | 348/565 |
| 5,568,385 | 10/1996 | Shelton | 364/420 |
| 5,619,430 | 4/1997 | Nolan et al. | 364/557 |
| 5,943,630 | 8/1999 | Busby et al. | |

FOREIGN PATENT DOCUMENTS

| | | | |
|---|---|---|---|
| 7-015682 | 1/1995 | Japan | H04N 5/445 |
| 7107403 | 4/1995 | Japan . | |
| 9-080167 | 3/1997 | Japan | G01W 1/02 |

*Primary Examiner*—Thomas G. Black
*Assistant Examiner*—Uyen Le
*Attorney, Agent, or Firm*—Thomas R. Vigil

[57] ABSTRACT

The weather parameter display system includes a visual display and at least one weather parameter sensing module positioned inside or outside a building for sensing or measuring and obtaining an indication of a weather parameter. Each weather parameter sensing module has circuitry for receiving a signal, circuitry responsive to the received signal for sensing a weather parameter value and circuitry for transmitting the value of the weather parameter sensed. A remote control is provided having circuitry for causing the sending of a signal which will cause actuation of the weather parameter sensing module to cause a reading to be taken of the value of a weather parameter and to be transmitted. Further there is provided circuitry associated with the visual display for receiving the transmitted weather parameter value signal and for causing the weather parameter value to be displayed on the visual display.

13 Claims, 6 Drawing Sheets

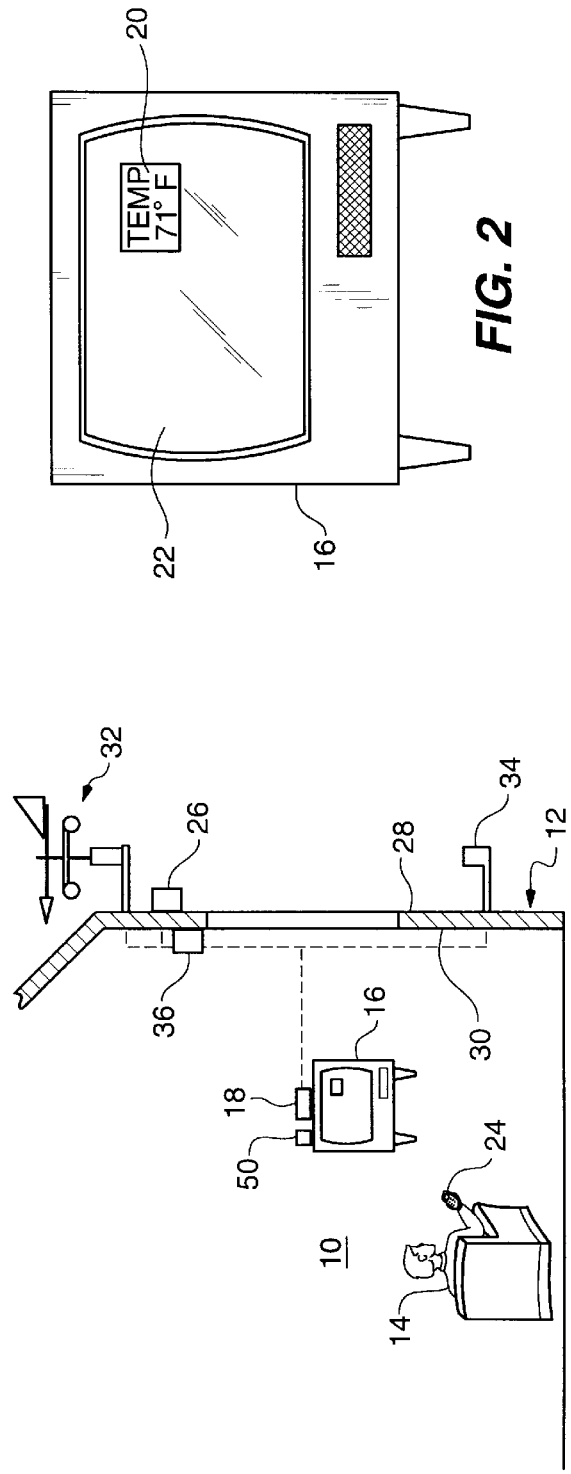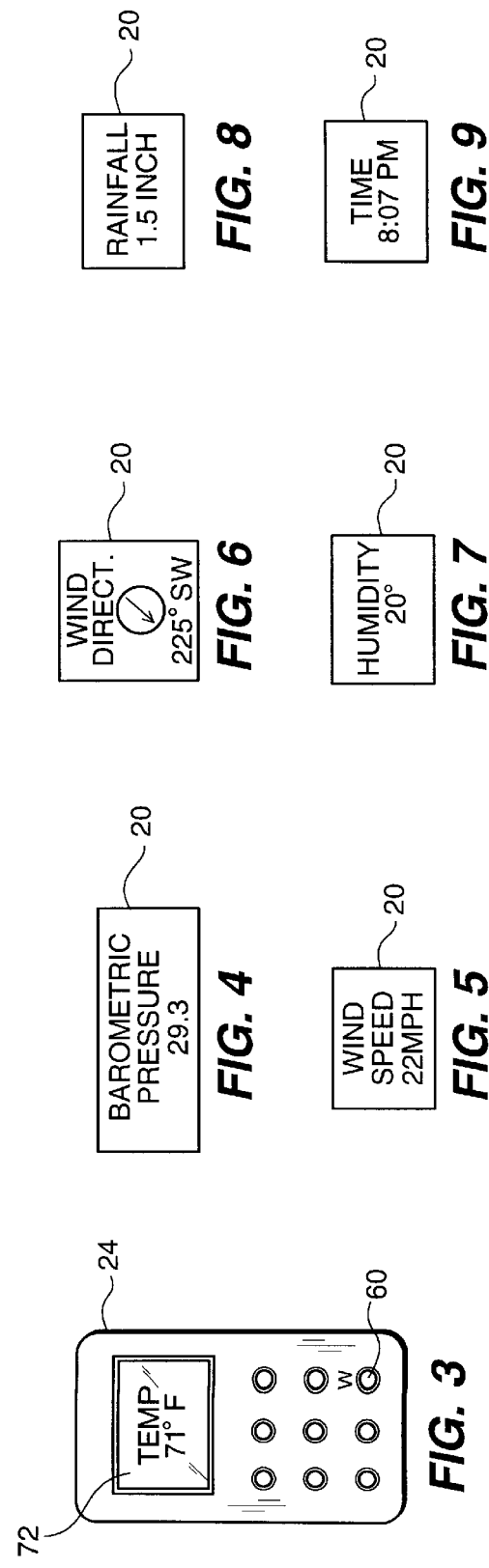

WEATHER PARAMETER DISPLAY SYSTEM

BACKGROUND OF THE INVENTION

1. Field of the Invention

The present invention relates to a system for displaying, under the control of a remote control, on a television set, on a separate display or on a display on the remote control, an indication or reading of a weather parameter, such as, the outside or inside temperature and/or other parameters of interest to an individual, such as, barometric pressure, wind speed, wind direction, humidity, rain fall and/or time. All of these indications or readings are provided with the use and under the control of the remote control.

2. Description of the Related Art Including Information Disclosed Under 37 CFR §§ 1.97–1.99.

Heretofore, systems have been provided which display time on the lower corner of a television set and remote controls have been programmed for turning on and turning off the time indicator.

Also heretofore, various devices, namely watches have been provided for indicating parameters such as ambient or barometric pressure and temperature. One example of such a previously proposed temperature indicator, particularly in a watch, is disclosed in the Okuyama U.S. Pat. No. 5,583,830. Also see, the Nitta et al. U.S. Pat. No. 5,224,059 and the Flora et al. U.S. Design Pat. No. 376,763.

There also has been proposed in the Shelton U.S. Pat. No. 5,568,385 a computerized weather detection and reporting system for detecting weather information at multiple sites and for communicating that information to multiple end users, the weather parameters including temperature, wind chill, humidity, rain or snow, barometer pressure, wind speed and wind direction.

Further, there is disclosed in the McBean, Sr. U.S. Pat. No. 5,347,476 an instrumentation system for measuring voltages, temperatures, pressure, sound intensity, and illumination using a hand-held computer-based measuring meter having a visual display in conjunction with a plurality of different sensor modules which are interconnected with the common measuring meter whereby the common measuring meter can display a wide variety of test parameters.

Further, it has been proposed in and is now very common in the television art to provide a picture in a picture. Some examples of such picture in a picture television systems are disclosed in the following U.S. Patents:

| U.S. Pat. No. | Patentee |
| --- | --- |
| 5,432,561 | Strubbe |
| 5,438,372 | Tsumori et al. |
| 5,557,338 | Maze et al. |
| 5,528,304 | Cherrick et al. |
| 5,561,471 | Kim et al. |

SUMMARY OF THE INVENTION

According to the present invention there is provided a weather parameter display system including a visual display, at least one weather parameter sensing module positioned inside or outside a building for sensing or measuring and obtaining an indication of a weather parameter. Each weather parameter sensing module has circuitry for receiving a signal, circuitry responsive to the received signal for sensing a weather parameter value and circuitry for transmitting the weather parameter value. A remote control is provided having circuitry for causing the sending of a signal which will cause actuation of the weather parameter sensing module to cause a reading to be taken of the value of the weather parameter and transmitted. Further there is provided circuitry associated with the visual display for receiving the transmitted weather parameter value signal and for causing the weather parameter value to be displayed on the visual display

BRIEF DESCRIPTION OF THE DRAWINGS

FIG. 1 is a view of part of a room in a house and shows an individual watching a television set having a window at a corner of the TV screen for indicating a parameter, e.g., temperature, pressure, wind speed, wind direction, humidity, rainfall or time and shows a sensor module mounted inside and outside the house.

FIG. 2 is a front plan view of the television set and shows the window displaying a value of the inside temperature or of the outside temperature.

FIG. 3 is a top plan view of a remote control having a visual display for displaying temperature or other parameter constructed according to the teachings of the present invention.

FIG. 4 is a plan view of the window in FIG. 3 or the display in FIG. 2 displaying barometric pressure.

FIG. 5 is a plan view of the window shown in FIG. 2 or the display shown in FIG. 3 displaying wind speed.

FIG. 6 is a plan view of the window shown in FIG. 2 or the display shown in FIG. 3 displaying wind direction.

FIG. 7 is a plan view of the window shown in FIG. 2 or the display shown in FIG. 3 displaying humidity.

FIG. 8 is a plan view of the window shown in FIG. 2 or the display shown in FIG. 3 displaying rainfall.

FIG. 9 is a plan view of the window shown in FIG. 2 or the display shown in FIG. 3 displaying time.

DESCRIPTION OF THE PREFERRED EMBODIMENT(S)

Figure 10:
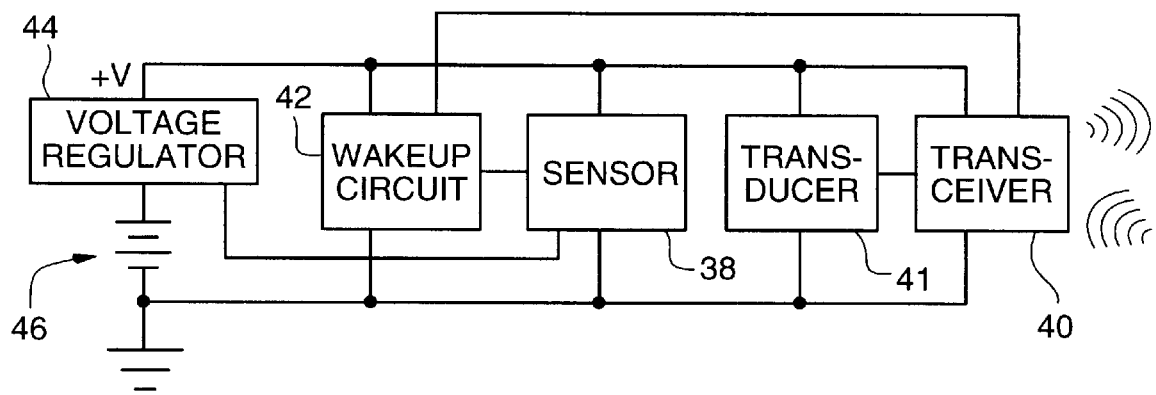
FIG. 10 is a block schematic circuit diagram of a sensor circuit in the sensor module for sensing a parameter, such as temperature, including transceiver circuitry for transmitting a value representative of the parameter sensed to a transceiver unit in the television set, in a remote control or in a display box positioned in the room, e.g., on the television set.

Referring now to the drawings in greater detail, there is illustrated in FIG. 1 a living room 10 in a building or house 12. An individual 14 is shown sitting in the living room 10 watching a television set 16 which has a cable box 18 thereon. The television set 16 is arranged to have a window or display screen 20 in an upper right hand corner of a TV screen 22 of the TV set 16 for displaying something other than the program on the station being viewed such as a menu, a message, or a reduced in size view of another program on another station.

The individual 14 is shown holding a remote control 24 for operating the television set 16 and for causing different parameters to be displayed in the window 20 on the screen 22 of the television set 16.

Also, as shown in FIG. 1, at least one weather parameter sensing module 26 is mounted to an outside wall 28 for sensing temperature. Additional weather parameter sensing modules also can be mounted or the outside wall 28 and even on an inside wall 30 of the house 12. For example, a wind direction and wind speed sensing module 32 can be mounted on the outside wall 28 as shown.

Further the temperature sensor module 26 can include a sensor unit for sensing barometric pressure and/or for sensing humidity.

If desired, a rainfall sensing unit or module 34 can be mounted to the outside wall 28 as shown.

Finally, an inside temperature and or humidity sensor unit or module 36 can be mounted on the inside wall 30, if desired.

Each sensing or sensor module or unit, e.g., sensor module 26, has sensor circuitry 37 including a sensor, e.g., temperature sensor 38, as shown in FIG. 10, a transceiver circuit 40, a transducer circuit (A/D or D/A converter) 41 coupled between the sensor 38 and the transceiver circuit 40, a wake up circuit 42 coupled between the transceiver circuit 40 and a voltage regulator and battery low indicating circuit 44 and one or more batteries 46. If desired, the sensing module, e.g., sensor module 26 can be hardwired by a cable 48, shown in phantom in FIG. 1, to the cable box 18 or to a display box 50 situated in the room 10, in which case, the batteries 46 and the voltage regulator and battery low indicating circuit 44 can be eliminated from the sensor circuitry 37 which then will be powered by AC voltage.

The sensor module 32 mounted on the outside of the house includes a wind speed and wind direction sensor which can be of the type manufactured by Signet Marine of Torrence, Calif.

As stated above, the lower sensor module 26 can be a single parameter sensing unit (temperature) or a multi parameter sensing unit for sensing temperature, pressure and/or humidity. All the sensor units shown will have a transducer circuit 41 for transducing the signal picked up by the sensor 38 to a digital signal which is transmitted in analog or digital form by the transceiver circuit 40 to the cable box 18 or display box 50 or even to the remote control 24.

The window 20 is shown enlarged in FIG. 2 at the upper right hand corner of the screen 22, although it could be positioned at another location, e.g., the lower right hand corner or lower left hand corner.

The window 22 shown in FIG. 2 is shown displaying the current outdoor temperature or current indoor temperature.

According to the teachings of the present invention, the remote control 24 of the present invention has a least one button or switch 60 which can be labeled "WEATHER" or "W" or, in the simplest form of the invention, "TEMP".

If the system is only to be used to display outdoor temperature, the user, by pressing the "TEMP" button 60 will cause the remote control 24 to send an IR signal to the cable box 18 to cause the same to send a radio frequency signal to the outdoor temperature sensor 38. This signal will "wake up" the sensor circuitry 37 (FIG. 10) via the wake up circuit 42 and tell the circuitry 37 to transmit a signal via the transceiver 40, indicative of the temperature sensed by the sensor 38. If the voltage is low, meaning the battery(ies) needs to be replaced, the voltage regulator and battery low indicating circuit 44 will cause the transceiver 40 to send a "battery low" signal. This signal is then received by a transceiver 62 (FIG. 11) in the cable box 18, which outputs, via hard wire or infrared signal, a signal to the television set 16 telling it to display the value of the outdoor temperature in the window 20 or a message "battery low".

It is to be understood that the temperature indicating system of the present invention just described above can be modified in several ways.

Figure 12A:
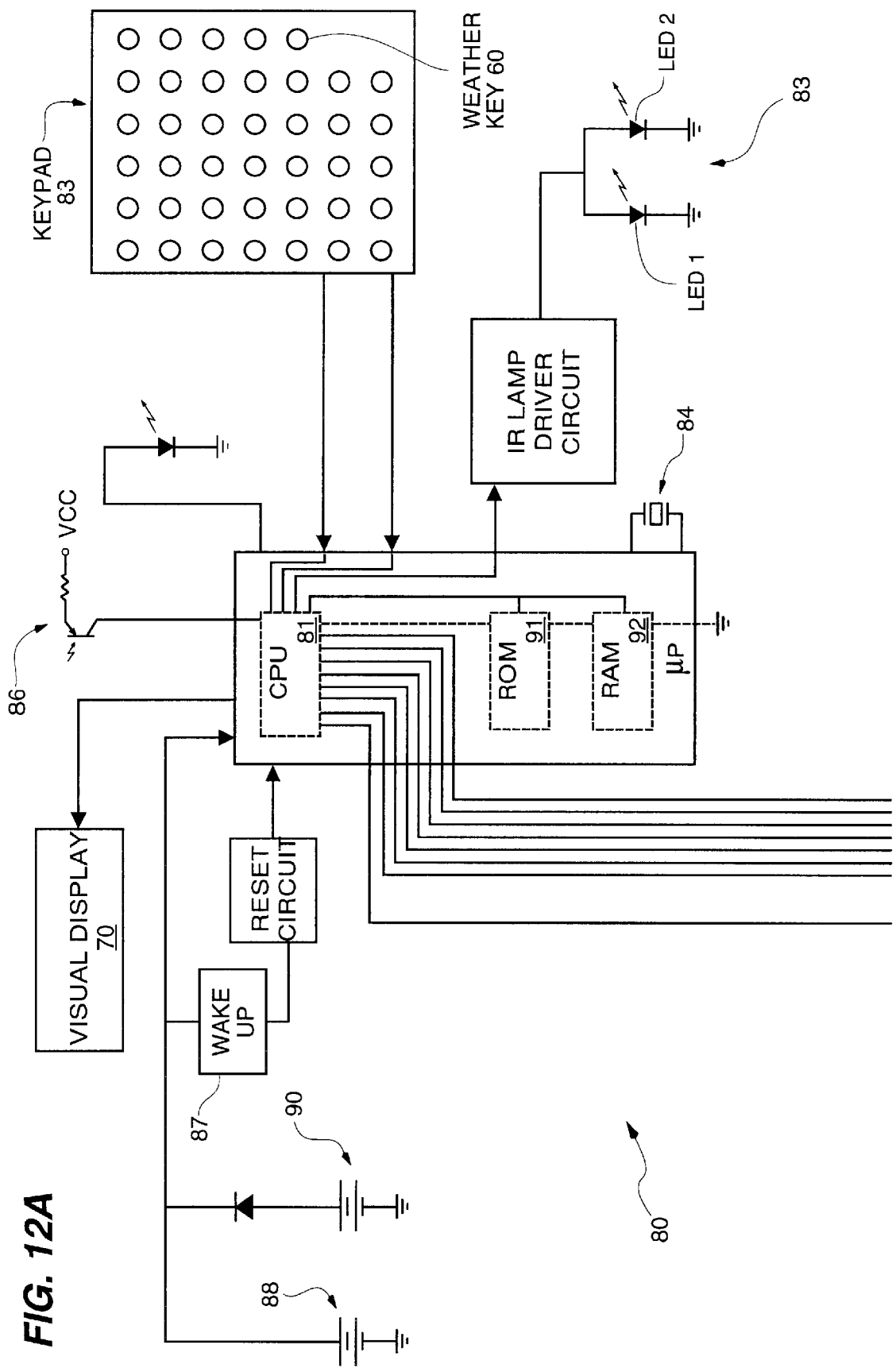
FIG. 12 is a block schematic diagram of the circuit elements inside the remote control for sending IR signals to the transceiver unit or RF signals to the sensor modules for fetching a signal representative of the parameter sensed by the module and for causing the value of the parameter sensed to be displayed in the window or the display.
Figure 12B:
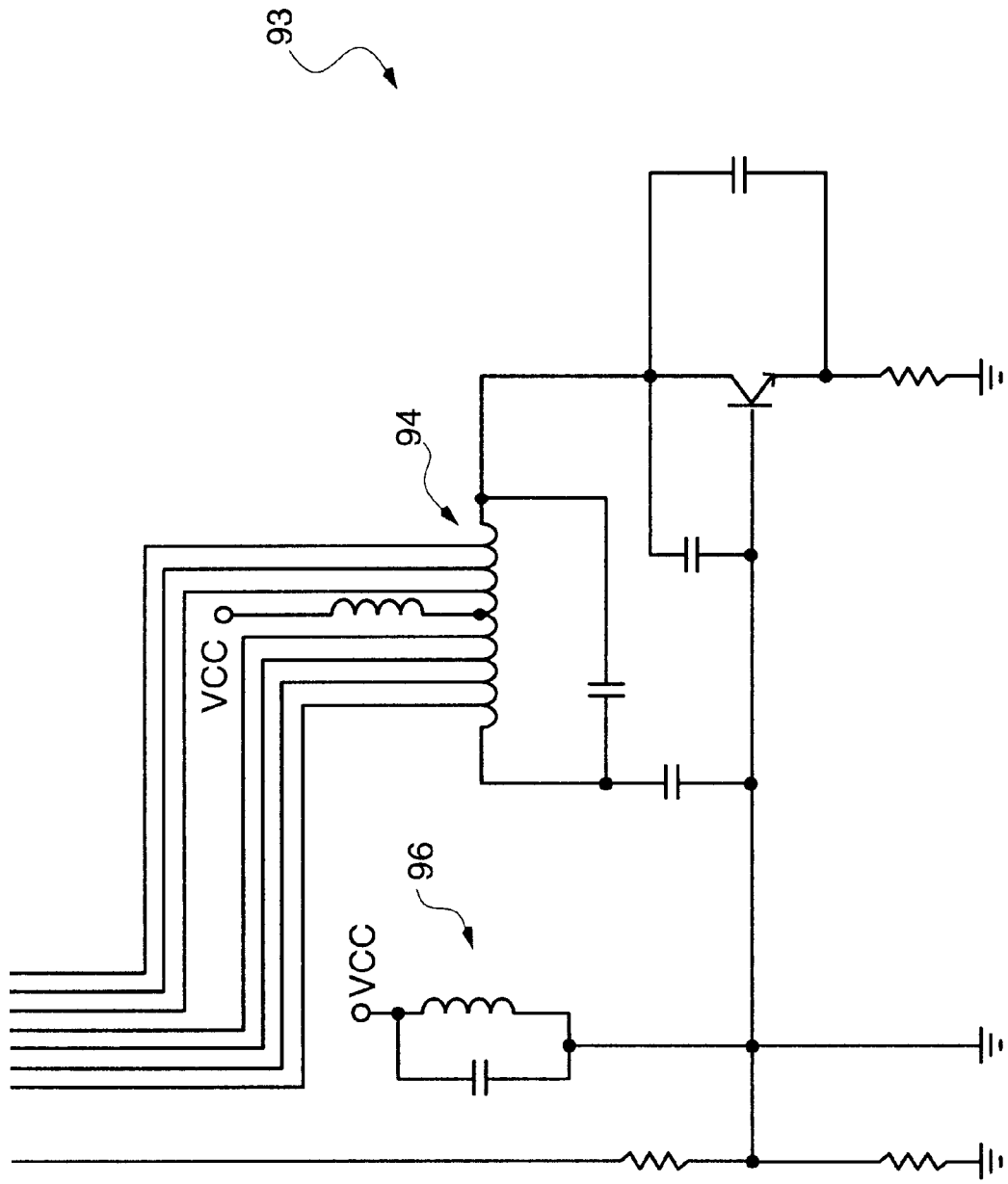

First of all, the remote control 24 can have a visual display 70 thereon whereby the cable control box 18 will emit an IR signal that is received by an IR receiver circuit 80 (FIG. 12) in the remote control 24 for causing the remote control 24 to display the temperature on the visual display 70 (FIG. 3) of the remote control 24.

In another modification, the cable box 18 or a separate display box 50 can have a visual display 72 for displaying the weather parameter, e.g., outdoor temperature.

As a third modification, the remote control 24 can be provided with an RF transceiver circuit for transmitting a wake up signal to a weather parameter sensing module, such as the outdoor temperature sensor unit 26, for causing the same to wake up and sense temperature and transmit an RF signal, indicative of the temperature, back to the remote control 24. Then, the remote control 24 can display the temperature on the visual display 72 or, in a further modification transmit a signal via RF or IR to the separate visual display box 50 positioned in the room 10, e.g., on the television set 16 for causing the visual display 72 to display the weather parameter sensed, in this instance, outdoor temperature.

Expanding from a measurement of outdoor temperature, the indicating system can be used to "wake up", the indoor temperature sensor module 36 for enabling one to learn the indoor temperature as well as the outdoor temperature.

This concept can be extended still further for measuring: the outside barometric temperature in the window 20 as shown in FIG. 4, from a pressure sensing circuit mounted in the outdoor temperature sensor unit 26; the wind speed in the window 20 (FIG. 5) which is picked up from the wind sensor 32 mounted outside the house 12; the wind direction in the window 20 (FIG. 6) from the wind direction sensor 32 mounted outside the house 12; humidity in the window 20 (FIG. 7) from a humidity sensor also mounted in the outdoor temperature sensor module or unit 26; rainfall in the window 20 (FIG. 8) from the rainfall measuring sensor unit 34 mounted outside the house 12; and time in the window 20 (FIG. 9) determined from the television signal received by the television set 16.

In FIG. 10 there is illustrated the sensor circuitry 37 which is mounted in each one of the sensor modules or units 26, 32, 34 or 36. Each sensor module will include a source of AC or DC power, typically DC battery 46, as well as the sensor 38 for measuring a particular weather parameter, e.g., temperature. The circuitry 37 also includes the transducer circuit 41, the RF transceiver 40, the wake up circuit 42 coupled between the sensor 38 and the RF transceiver 40 for energizing the sensor 38 to make a reading of the weather parameter, e.g., temperature, and then cause the transceiver 40 to transmit a temperature value signal to the transceiver 62 in the box 18 or 50 or a receiving antenna in the remote control 24.

Figure 11:
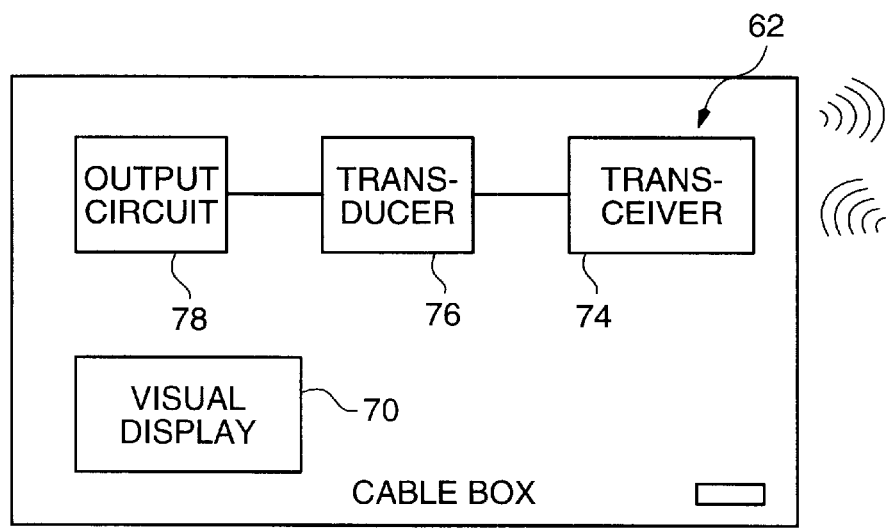
FIG. 11 is a block schematic diagram of the circuit elements of the transceiver circuit in the transceiver unit for receiving and transducing the signal received from the sensing circuit indicative of the parameter sensed which can be output from the transceiver circuit to the television set under the control of a remote control, to the display box or to the remote control.

In FIG. 11, there is illustrated a block schematic circuit diagram of the transceiver 62 for receiving a signal from the sensor module 26 and outputting same to the television set 16, to the display 72 in the box 18 or 50 or to the remote control 24. The transceiver 62 includes a transmitting and receiving circuit 74, a transducer circuit 76 and an output circuit 78 for outputting an electrical signal (hard wired) or an IR or RF signal to the display 72 in the box 18 or 50 or to the television set 16 for causing a weather parameter to be displayed in the window 20.

FIG'S. 12A and 12B are a block schematic circuit diagram of circuitry 80 that can be provided in the remote control 24.

The circuitry 80 includes a CPU 81 having a keypad circuit 82 connected thereto, output LED's 83, an oscillator clock circuit 84, an IR input circuit 86, a wake up circuit 87, a main battery 88 and a backup battery 90 and a RAM 91 and ROM 92 connected to the CPU 81 and a transceiver circuit 93 (FIG. 12B), including, a multiple frequency transmitting antenna 94 and a receiving antenna 96 connected to the CPU 81.

Figure 13A:
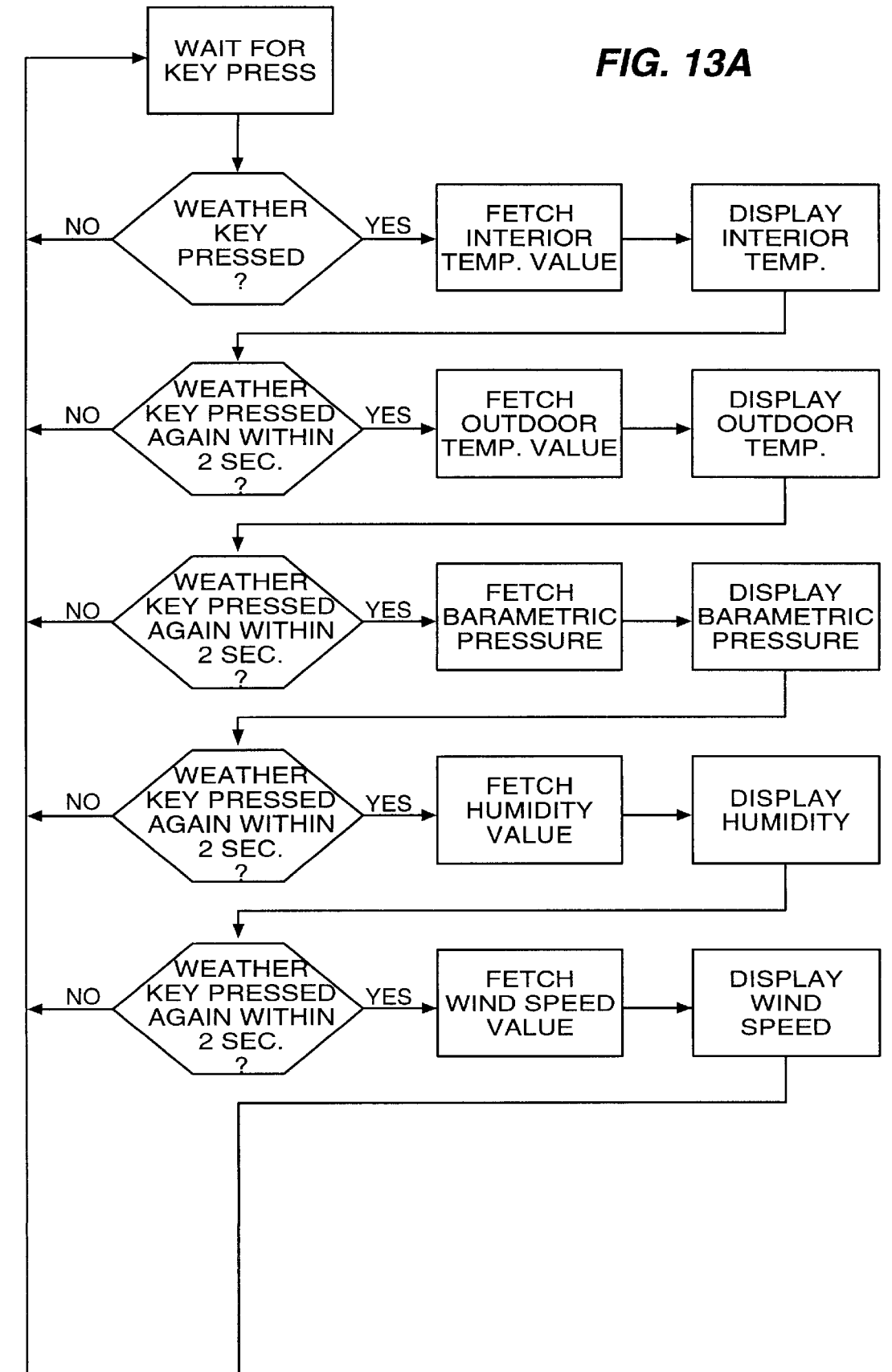
FIG. 13 is a flow chart of the routine carried out by a microprocessor in the remote control to cause a parameter value to be displayed in the window or the display.
Figure 13B:
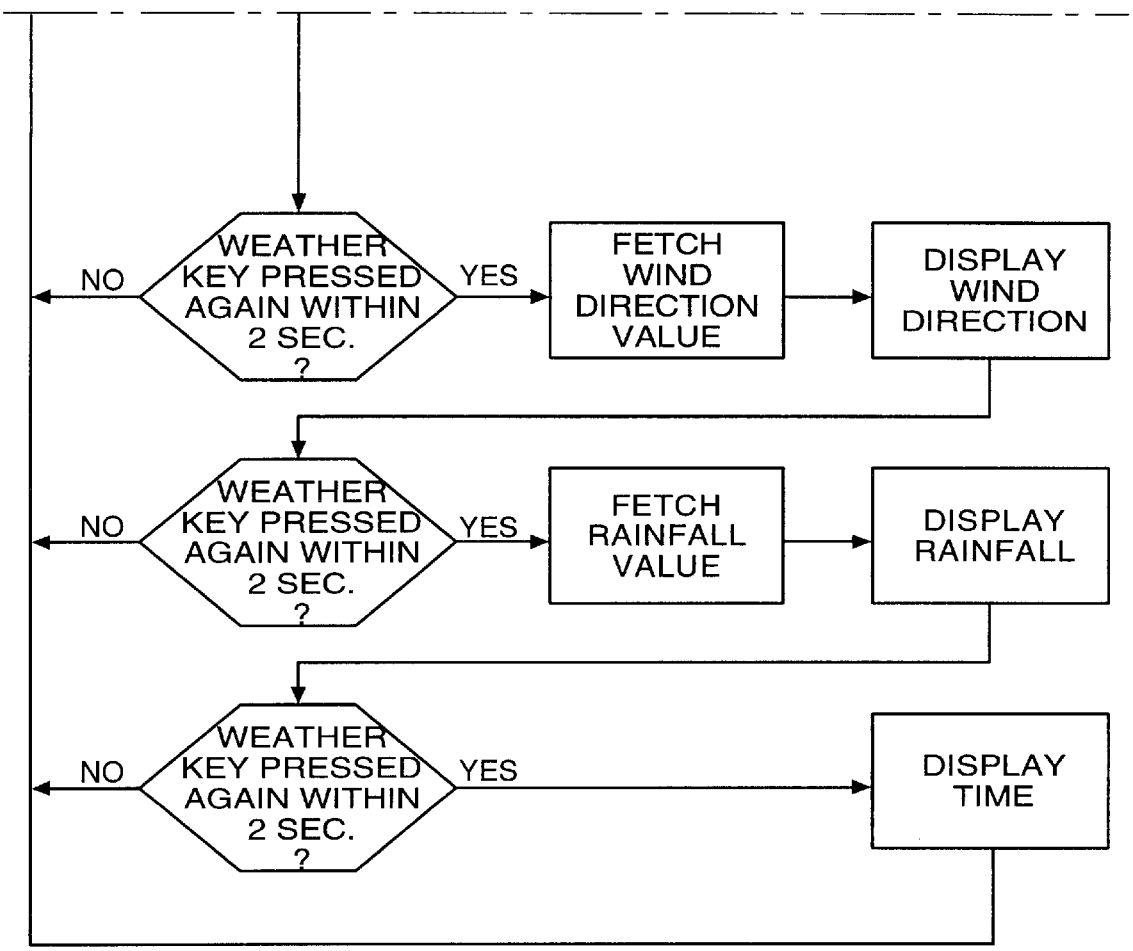

FIG. 13 is a flow chart of the routine or protocol carried out by a microprocessor in the remote control 24 for fetching and displaying weather parameters.

The flow chart shows a simple system for fetching and displaying the various weather parameters upon repeated pressing of the weather key. It is to be understood, of course, that separate keys can be provided for each one of the parameters if desired and for causing a different frequency signal to be sent by the transmitting antenna 94 and, of course, the received signal indicative of a value of a weather parameter, such as outside temperature, will be picked up by the pickup antenna 96 and transmitted to the CPU where it is then utilized to display on visual display, e.g. display 20, 70 or 72, the weather parameter value, i.e., outside temperature.

In the operation of the weather parameter display system of the present invention, an operator will press the "WEATHER", "w" or "TEMP" key 60 on the remote control 24. This will cause a signal to be sent to one of the weather sensor modules from the cable box 18 via the hard wire connection to the sensor modules or from the transceiver 62 or from the antenna 94 shown in FIG. 1B which will send a specific frequency signal to actuate a distinct one of the weather parameter sensing modules 26, 32, 34 and 36. The signal will be transmitted by the transmitting antenna 94 or similar transmitting antenna in the transceiver circuit 74 to the selected weather parameter sensing module, which will be activated depending upon the frequency of the signal sent. The sensing module will then send a signal to the wake up circuit 42 which will then cause the voltage regulator to supply voltage to the sensor 38 or to tell the wake up circuit that the voltage is too low to make a reliable reading at which point the wake up circuit will transmit to the transceiver circuit 40 a "battery low" indication signal which will be transmitted back to the transceiver 74 for the receiving antenna 96. If there is sufficient battery voltage, then the voltage regulator 44 will supply voltage to sensor 38 which will make a reading of a weather parameter and pass the reading onto the transducer 44 which will convert the signal to the appropriate analog or digital signal which is then transmitted by the transceiver circuit 40. The transceiver circuit 40 then transmits a radio frequency signal which is picked up by the antenna 94 or the transceiver 62 and transformed by the transducer 76 or the CPU 81 to a signal that can be presented to a visual display such as the window 20 on the screen 22 of the television set 16 or the visual display 70 or 72 for displaying a weather parameter value.

From the foregoing description, it will be apparent that the weather parameter display system of the present invention has a number of advantages, some of which have been described above and others of which are inherent in the invention. Also it will be understood that modifications can be made to the weacher parameter display system described above without departing from the teachings of the present invention. Accordingly, the scope of the invention is only to be limited as necessitated by the accompanying claims.

I claim:

1. A weather parameter display system including a visual display selected from the class comprising a visual display in a cable control box, a window display within a television display screen, a visual display on a television remote control, or a separate visual display under the control of the television remote control, a separate, wireless, television remote control, at least one weather parameter sensing module positioned inside or outside a building for sensing or measuring and obtaining an indication of a weather parameter, each said weather parameter sensing module having means for receiving a discrete signal from said television remote control, means responsive to said received signal for sensing the value of a weather parameter value and means for transmitting said weather parameter value sensed to one of said television remote control, a cable control box, or a television set, said television remote control having first circuit means for causing the sending of said discrete signal including a radio frequency (RF) transceiver in said remote control which is constructed and arranged to transmit a discrete radio frequency signal to each one of the weather parameter sensor modules which discrete signal will cause actuation of said weather parameter sensing module to cause a reading (a) to be taken of the value of the weather parameter and (b) to be transmitted, second circuit means associated with the visual display for receiving the transmitted weather parameter value signal, third circuit means for decoding the signal transmitted by said weather parameter sensing module and for causing the weather parameter value to be displayed on said visual display and a designated key or button on said remote control for actuating said first circuit means.

2. The weather parameter display system claim 1 wherein said at least one weather parameter value sensor module includes an outside temperature sensing module.

3. The weather parameter display system claim 1 wherein said at least one weather parameter sensing module includes an inside temperature sensing module.

4. The weather parameter display system claim 1 wherein said at least one weather parameter sensing module includes a barometric pressure sensor.

5. The weather parameter display system claim 1 wherein said at least one weather parameter sensing module includes a wind speed sensor.

6. The weather parameter display system claim 1 wherein said at least one weather parameter sensing module includes a wind direction sensor.

7. The weather parameter display system claim 1 wherein said at least one weather parameter sensing module includes a humidity sensor.

8. The weather parameter display system claim 1 wherein said at least one weather parameter sensing module includes a rain fall sensor.

9. The weather parameter display system claim 1 further including fourth circuit means for extracting from a television signal being received, the exact time, fifth circuit means for causing said time to be displayed on said visual display and a designated key or button on said remote control for causing the sending of a signal to said fifth circuit means to cause the time to be displayed on said visual display.

10. The weather parameter display system of claim 1 wherein said visual display is a picture-in-picture window on a screen for a television set.

11. The weather parameter display system of claim 1 wherein said visual display is mounted in a cable control box.

12. The weather parameter display system of claim 1 wherein said visual display is mounted on said remote control.

13. The weather parameter display system of claim 1 wherein each weather parameter sensing module includes a source of AC or DC power, a voltage regulator and low battery indicating circuit coupled to said source of power, a transceiver circuit, a wake up circuit coupled between transceiver circuit and said voltage regulator circuit, a weather parameter sensor coulped to said voltage regulator and low battery indicating circuit and a transducer circuit coupled between said sensor and said transceiver circuit.

* * * * *